United States Patent [19]
Kramer

[11] Patent Number: 5,194,678
[45] Date of Patent: Mar. 16, 1993

[54] FIREARM REST
[76] Inventor: Terry Kramer, 302 Lump Gulch, Clancy, Mont. 59634
[21] Appl. No.: 827,703
[22] Filed: Jan. 27, 1992
[51] Int. Cl.$^5$ .............. F41A 23/10; F41A 35/00
[52] U.S. Cl. .................................. 42/94; 89/37.04
[58] Field of Search ......................... 42/94; 89/37.04
[56] References Cited

U.S. PATENT DOCUMENTS

| | | | |
|---|---|---|---|
| 1,295,688 | 2/1919 | Butler | 42/94 |
| 1,524,973 | 2/1925 | Hazelton | 42/94 |
| 2,436,349 | 3/1945 | Adams | 42/94 |
| 2,489,283 | 8/1947 | Garand | 42/94 |
| 2,807,904 | 10/1957 | Kreske | 42/94 |
| 3,327,422 | 1/1967 | Harris | 42/94 |
| 3,445,082 | 5/1969 | Proctor et al. | 42/94 |
| 3,938,273 | 2/1976 | Tellié | 42/94 |
| 4,265,045 | 5/1981 | Garbini | 42/94 |
| 4,397,112 | 2/1983 | York | 42/94 |
| 4,607,561 | 1/1986 | Frimer | 89/37.04 |
| 4,625,620 | 12/1986 | Harris | 89/37.04 |
| 4,776,124 | 10/1988 | Clifton | 42/94 |
| 4,795,165 | 1/1989 | Tehan | 273/416 |
| 4,903,425 | 2/1990 | Harris | 42/94 |
| 5,029,407 | 7/1991 | Kirkpatrick | 42/94 |
| 5,036,613 | 8/1991 | Smith | 42/94 |

FOREIGN PATENT DOCUMENTS

| | | | |
|---|---|---|---|
| 197104 | 4/1908 | Fed. Rep. of Germany | 42/94 |
| 2339 | of 1907 | United Kingdom | 42/94 |
| 202131 | 8/1923 | United Kingdom | 42/95 |

OTHER PUBLICATIONS

Guns & Ammo, Ross Seyfried, Shooter's In-Sight, Apr. 1992, pp. 14 & 15.

Primary Examiner—David H. Brown
Attorney, Agent, or Firm—Harry M. Cross, Jr.

[57] ABSTRACT

A rest for a firearm or the like that attaches to the sling swivel on the forearm of the firearm. Said rest is comprised of two major assemblies. First assembly attaches to the sling swivel and provides a surrogate sling swivel and a female receptacle for the second assembly. Second assembly consists of male protrusion that mates with first assembly and two lightweight legs that can be quickly assembled and disassembled. Said rest allows quick attachment and detachment in the field. With a static leg position, said rest allows the ability to move the muzzle of the firearm in a conical motion, and randomly within the confines of the cone, while concurrently adjusting the cant of the rifle.

17 Claims, 8 Drawing Sheets

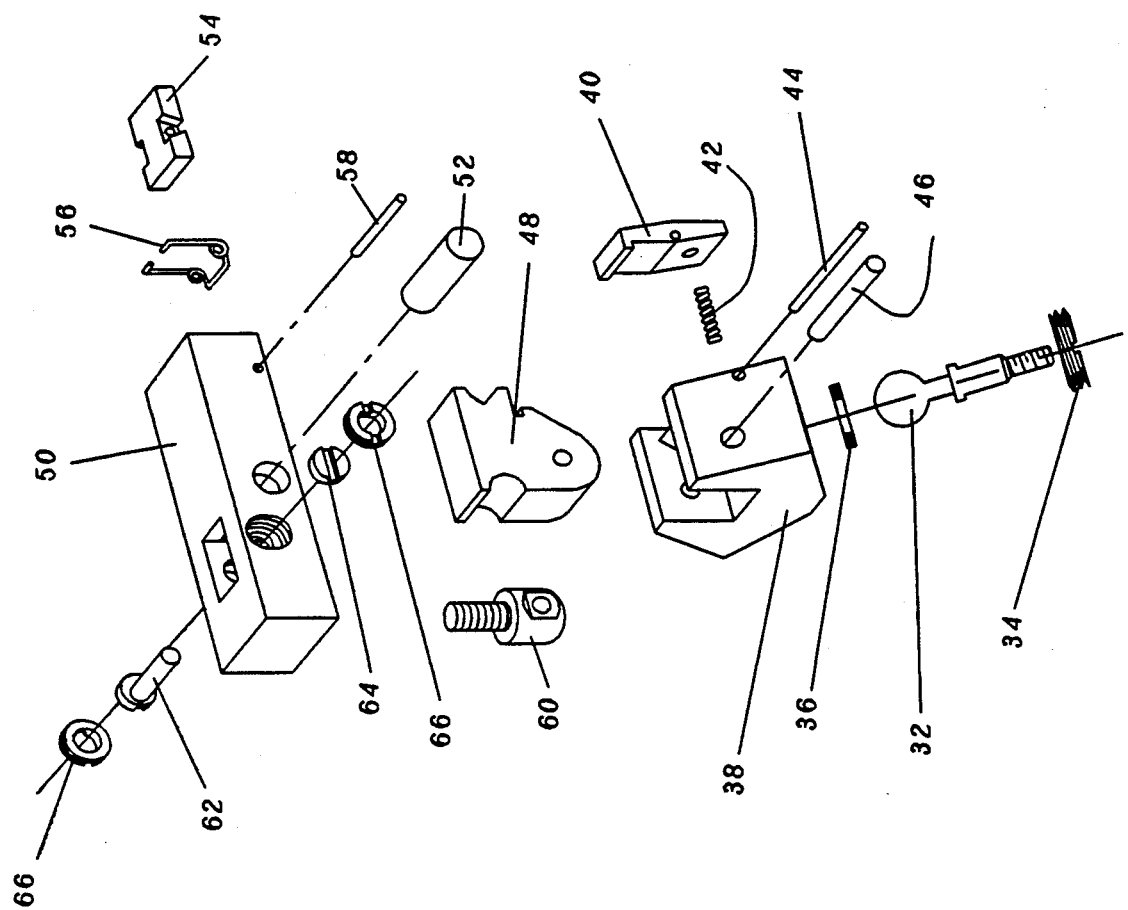
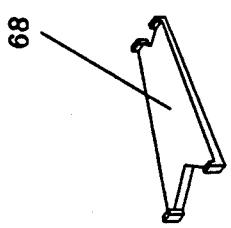
FIG. 4

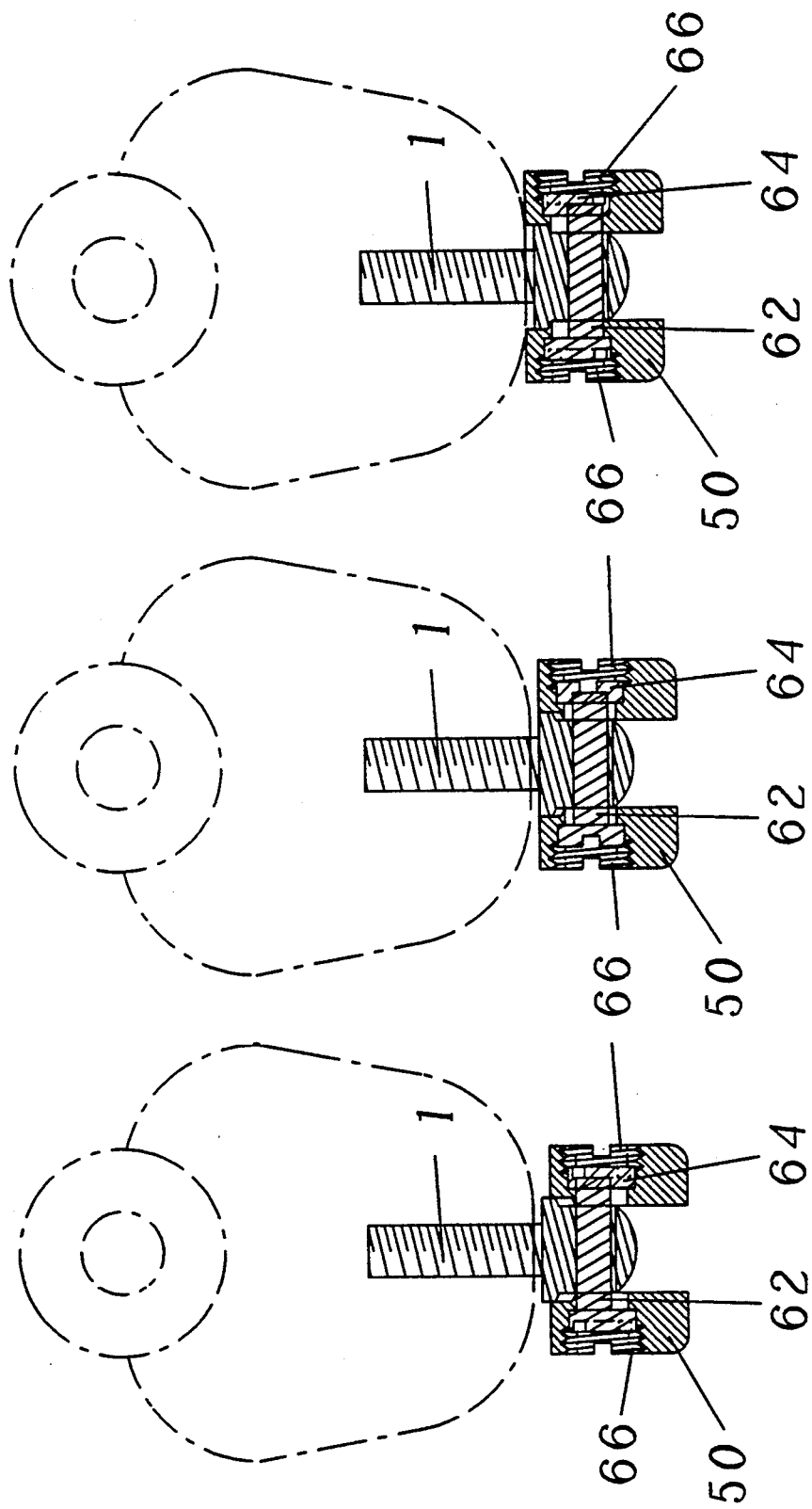

FIREARM REST

BACKGROUND—FIELD OF INVENTION

The present invention relates to firearm rests in general.

BACKGROUND—DESCRIPTION OF PRIOR ART

Since the creation of firearms, the use of peripheral support attachments have been used for reducing tremor, fatigue, and improving accuracy.

Prior art includes monopods, bipods and tripods which are affixed to the firearm. The oldest prior art includes the use of forked stick monopods, as used during the American Revolutionary War, and dual stick bipods, tied together to form a disproportionate X, as used by the buffalo hunters of the old west.

The tripod provides the most stability for unattended accurate shooting. When a firearm is fired by a human, the body can serve as one leg of the tripod. It is this ability, with the addition of a bipod, that completes the three legs of a tripod and provides the desired stability. This is the fundamental reason why the bipod has achieved market dominance over monopods or self contained tripods. This is the approach taken by U.S. Pat. No. 3,327,422 to Harris (1967) and U.S. Pat. No. 4,397,112 to York (1983).

A bipod can be constructed as an integral part of a firearm or as an auxiliary device. Prior art implementations that are auxiliary devices come in two major categories. Category one is the type that remain attached to the firearm (for at least the duration of a field outing) and usually provides a method for the bipod to fold under the barrel of the firearm when not in use. Category two is the type that the user carries on their person and attaches to the firearm when needed.

One of the major disadvantages of the category one bipods is that the weight of the bipod changes the normal balance point of the firearm. This added weight is near the muzzle, where it has the maximum leverage to work against the user when the bipod is not in use. Category one bipods also detract from the appearance of the firearm and provide additional protrusions for snagging foliage when used in the field. U.S. Pat. No. 3,327,422 to Harris (1967) is an example of this type of bipod.

Category two bipods do not have the disadvantages just mentioned for category one bipods, since category two bipods must be carried separate from the firearm. However, since they must be carried separately, it is important that they are compact and light. U.S. Pat. No. 4,397,112 to York (1983) is an example of this implementation.

Regardless of category, it is of primary importance that the implementation does not attach to the barrel of the firearm. Any change in weight, or non uniform pressure applied to the barrel, will affect accuracy. A proper bipod implementation will make use of the firearm's stock for the attachment. Many firearms have stocks that provide special protruding bolts for attaching a sling. This bolt also provides a convenient bipod attachment vehicle. Prior art U.S. Pat. No. 4,397,112 to Norman York (1983) is an example of the type of attachment that utilizes the barrel.

In general, prior art bipods also fail to perform one or more of the following "motion abilities":

1. The ability to rotate about an axis extending from the center of the earth to the bipod/firearm attachment point. This ability allows the user to "pan" or follow a moving target that is on the same horizontal plane as the user from left-to-right or right-to left. This ability will be herein called "horizontal panning motion".
2. The ability to rotate about an axis that is perpendicular to the firearm, and perpendicular to the axis extending from the center of the earth to the bipod/firearm attachment point. This ability allows the firearm and user to remain relatively stationary while vertical aim adjustments are done by moving the breach end of firearm up or down. Said another way, the inability to perform this motion, requires the firearm and user to move fore and aft in order to adjust the point of aim vertically. This ability will be herein called "vertical panning motion".
3. The ability to rotate about an axis that is parallel to the longitudinal axis of the firearm. This ability allows the user to tilt or cant the firearm in a manner that keeps the center of the barrel bore directly underneath the center of the sight line. This ability maintains the bullet point of impact expected from the sighting in process. This ability will be herein called "firearm cant motion".

U.S. Pat. No. 3,327,422 to Harris (1967) suffered from the inability to perform horizontal and vertical panning motion. Firearm cant motion was accomplished by adjusting the leg height. Having to adjust the leg height is an inconvenient and time consuming technique. U.S. Pat. No. 4,903,425 to Harris (1990) addressed the firearm cant motion deficiency of U.S. Pat. No. 3,327,422 to Harris (1967).

U.S. Pat. No. 4,607,561 to Frimer (1986) is an example of prior art that provides firearm cant motion and horizontal panning motion. It does not provide vertical panning motion, however it does allow the bipod to be rotated to a carrying orientation wherein the legs of the bipod lie parallel to the longitudinal axis of the firearm.

U.S. Pat. No. 4,397,112 to York (1983) is an example of prior art that does not provide horizontal panning motion or vertical panning motion, but accomplishes firearm cant motion by allowing the barrel of the firearm to slip in the jaws of the invention.

A bipod is best used when the user is at a low resting position. Normally this is either the prone or sitting position. In actual field circumstances, the sitting position is usually more practical since it positions the firearm above most ground obstacles such as grass, brush or snow. However, the prone position provides a more rigid foundation than the sitting position. A bipod should provide the ability to be shot from either position under most field circumstances.

Once the user has chosen the shooting position, either sitting or prone, a bipod should provide the ability to make quick and infinitesimal height adjustments to provide comfort for the user.

The design of the bipod legs in the prior art generally falls into one of the three following categories;
1. fixed length, non adjustable legs, no height adjustment;
2. fixed length, movable legs, adjustable height and;
3. adjustable telescoping legs, adjustable height.

Fixed length non adjustable leg bipods are generally strong, but being non adjustable have limits in the field. Generally, prior art of this type was restricted to short legs in order to maintain a compact bipod. Short legs limits shooting positions primarily to the prone position. U.S. Pat. No. 4,397,112 to York (1983) is an example of this type of bipod.

Fixed length, movable legs are generally strong, and provide for height adjustment by allowing the angle between the legs to be varied. The larger the angle (the wider the legs are spread out), the lower overall bipod height. The smaller the angle (the closer together the legs are), the higher overall bipod height. To provide substantial height adjustment, the bipod must allow considerable angle adjustment. U.S. Pat. No. 4,607,561 to Frimer (1986) is an example of this type of bipod. As is the case with fixed length non adjustable leg bipods, prior art of this type generally was restricted to short legs in order to maintain a compact bipod.

Adjustable telescoping legs provide adjustably in the field by allowing the user to vary the extension of the individual segments, and locking them in position. One limitation of this approach is that adjusting leg length is usually rather slow in the field. Another limitation is that the integrity of the bipod is dependent upon the security of the segment locking mechanism. An advantage of the telescoping legs is they generally provide a more compact collapsed bipod, yet have the capability to expand to the heights required for shooting from the sitting position.

Telescoping legs require the segment inside diameters be larger that the outside diameter of the adjacent segment. This is to provide the nesting capability. Differences in diameter produce different stiffness or "spine" (spine as defined by Easton Aluminum is the measured deflection, in inches, of a shaft of a given length when depressed by a 879.7 gram weight at its center). The telescoping leg design requires the designer to over-engineer the larger diameter segments in order to provide proper "spine" in the smaller nested segments. This over-engineering adds extra weight and bulk.

OBJECTS AND ADVANTAGES

Accordingly several objects and advantages of my invention are;
1. a bipod that is quickly attached to the firearm in the field, only when needed, so as to have negligible impact on the normal appearance and balance of the firearm;
2. a bipod that provides very quick and fine height adjustment;
3. a bipod that provides easy, fast and concurrent horizontal panning motion, vertical panning motion and firearm cant motion;
4. a bipod that is light and compact for storage, carrying and handling;
5. a bipod who's legs provide the uniformity of stiffness or "spine" generally found with fixed length legs, yet provide the ability to fold the legs into a compact carrying package;
6. a bipod that allows the use of either the sitting or prone shooting positions and;
7. a bipod that attaches to the stock of the firearm and not the barrel.

Further objects and advantages of my invention will become apparent from a consideration of the drawings and ensuing descriptions.

DESCRIPTION OF DRAWINGS

FIG. 4 is an exploded perspective view of the components comprising the bipod attachment unit, according to my invention (excluding legs). Specialized wrench for installation and adjustment is also shown.

FIGS. 8a, 8b and 8c are sectional views taken along line 8—8 of FIG. 5 and FIG. 6. The views show the surrogate sling block 50 during the stages of installation to the firearm sling swivel bolt.

| LIST OF REFERENCES NUMBERALS | | | |
|---|---|---|---|
| 20 | Foot | 46 | Leg rotation axle |
| 22 | Leg segment | 48 | Main attachment block |
| 24 | Elastic cord | 50 | Surrogate sling block |
| 26 | Cord lock | 52 | Main attachment axle |
| 28 | Tubular insert | 54 | Attachment retaining lever |
| 30 | Threaded female leg receptacle | 56 | Attachment retaining lever spring |
| 32 | Threaded male ball | 58 | Attachment retaining lever axle |
| 34 | Threaded ball socket keeper | 60 | Surrogate sling swivel |
| 36 | Ball socket washer | 62 | Eccentric sling swivel attachment pin |
| 38 | Leg junction | 64 | Eccentric pin receptor washer |
| 40 | Leg rotation release | 66 | Eccentric pin rotation locks |
| 42 | Leg rotation release spring | 68 | Wrench |
| 44 | Leg rotation release axle | | |

DESCRIPTION OF THE INVENTION

Figure 1:
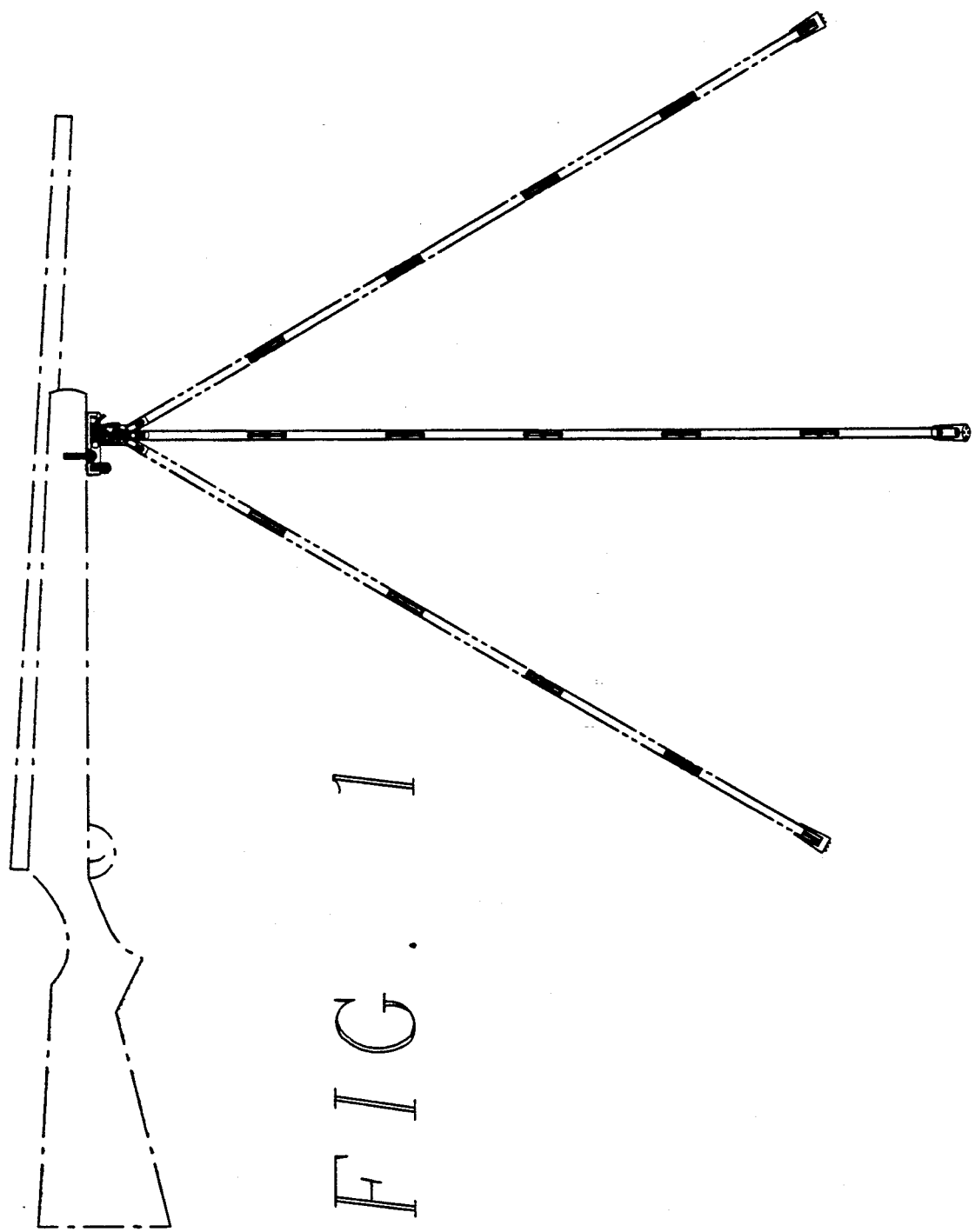
FIG. 1 is a side view of a firearm with attached bipod, according to my invention. Range of motion for the legs is shown with phantom lines.
Figure 2:
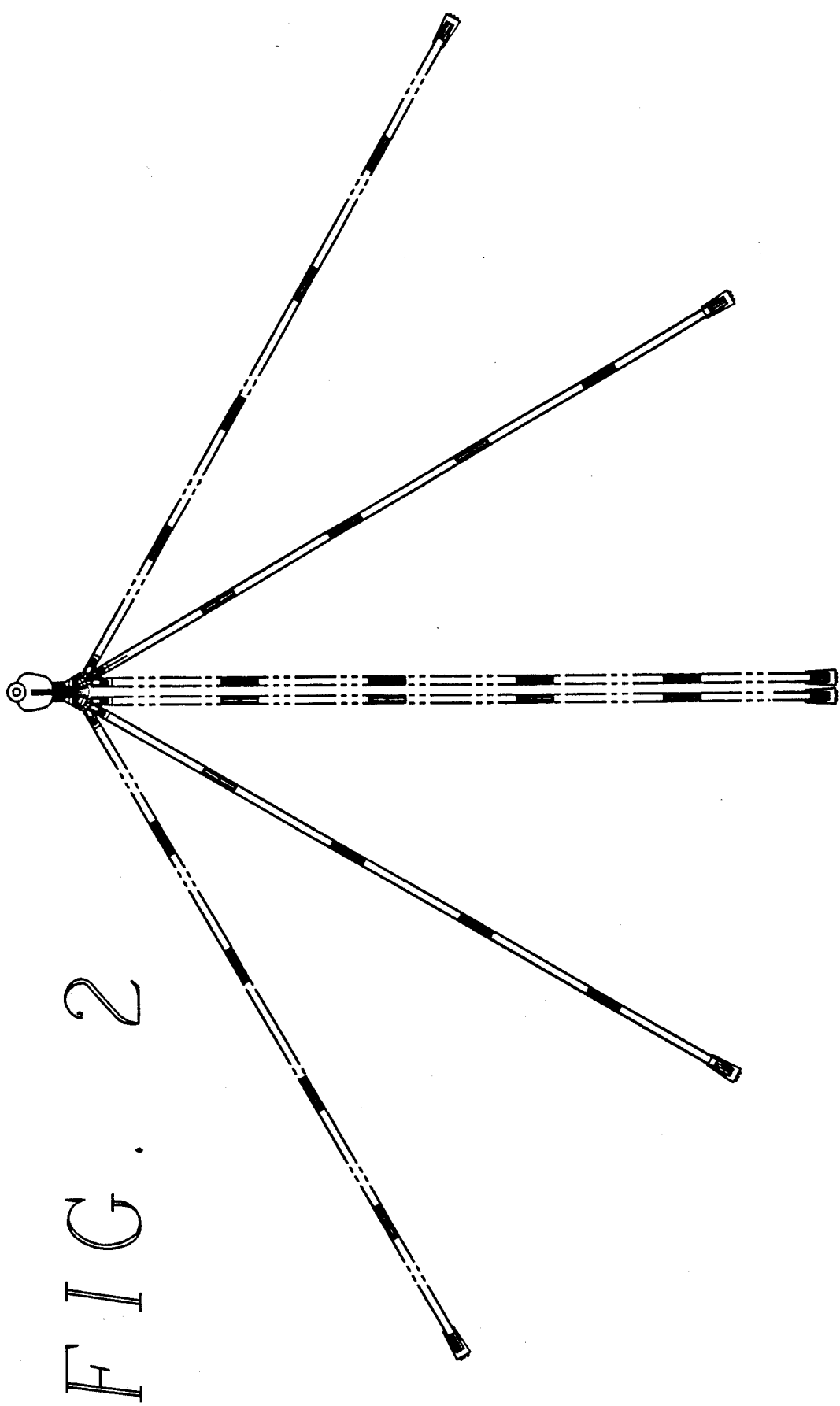
FIG. 2 is a view from the muzzle end of the firearm looking back towards the breach showing an attached bipod, according to my invention. Range of motion for the legs is shown with phantom lines.
Figure 3:
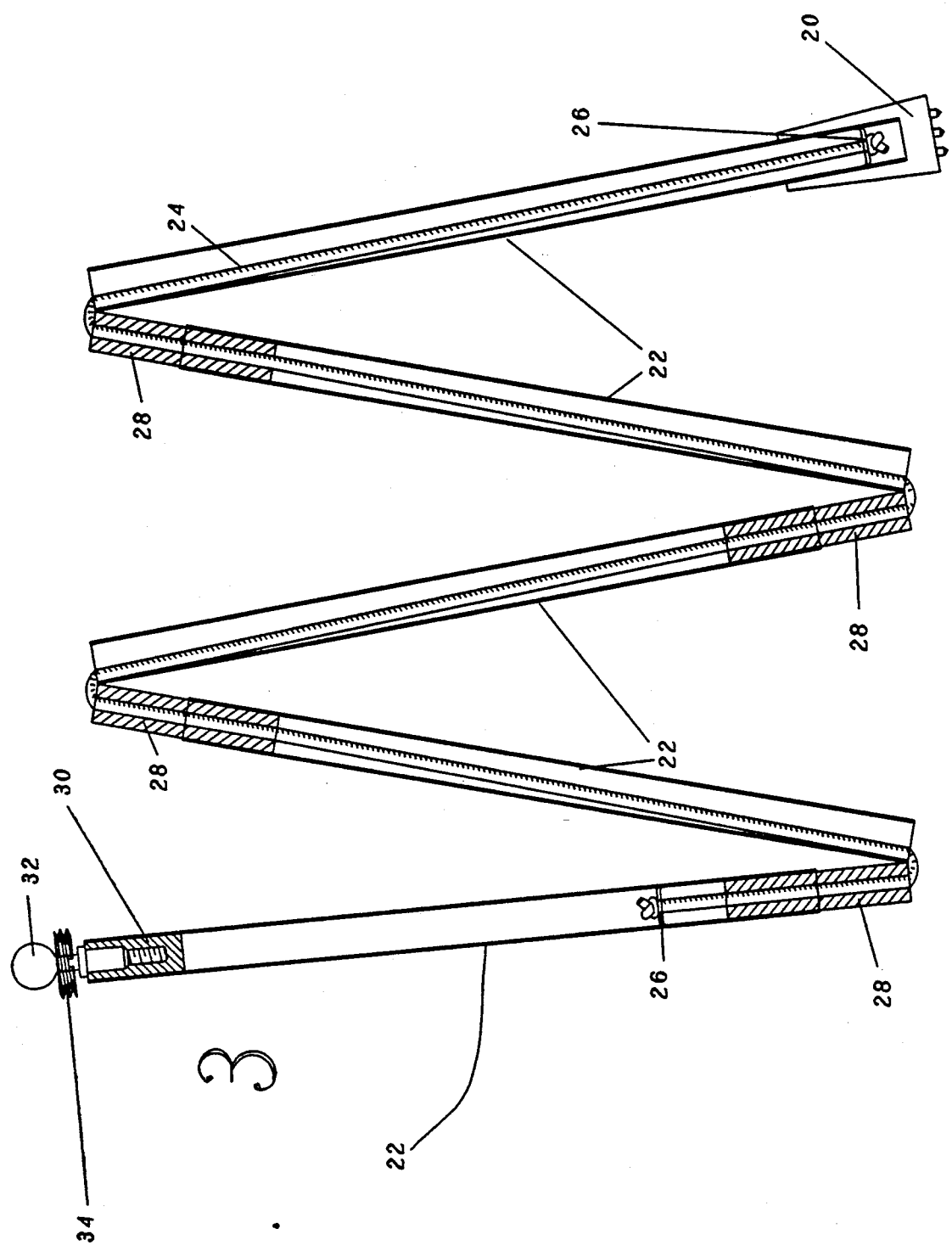
FIG. 3 is a sectional view of a single leg, according to my invention.

FIGS. 1 and 2 show a firearm bipod according to my invention. As shown in FIGS. 1, 2 and 3, the legs each have an attached foot 20. Each foot 20 is preferably constructed of a durable yet pliable substance to provide adequate grip on smooth surfaces. It is preferred that the bottom of each foot 20 have an irregular, bumpy surface to aid in adhesion with the earth, particularly in field conditions. In the preferred embodiment, I chose Sander's Archery blunt points.

The legs are constructed of a hollow tube material of uniform diameter and wall thickness. The hollow tube material can be made of any lightweight strong material, with fiberglass or aluminum being particularly well suited to this application. In the preferred embodiment, I chose Easton Aluminum 7075W-T9 aluminum alloy tent pole material with a outside diameter of 0.344", wall thickness of 0.019" and a gold anodized finish.

Referring to FIG. 3, the hollow tube is shown in multiple segments. The number of segments and the length of each segment is determined by the desired overall assembled length as well as the compactness desired when in the folded position. In the preferred embodiment, I chose five segments approximately five to seven inches in length, resulting in a assembled length approximately thirty to thirty five inches. This approximate length will generally suit most short through tall height adults when shooting from the sitting position. An advantage for using an uneven number of segments is that when folded, the foot 20 is opposite of the threaded male ball 32, which contributes to a smaller folded package. Five segments also provide for a small and compact folded bipod. The total of ten segments (for both legs), folded and tightly wrapped together, produces a bundle with a diameter smaller than one and one half inches.

As shown in FIG. 3, four of the five segments have a tubular insert 28 that is affixed by force fit, adhesive or some other technique. Tubular insert 28 acts as a slip-joint connector and male protrusion to enable the segment to mate with the adjacent segment's female end. Tubular insert 28's outside diameter should closely match the inside diameter of the segment to provide a joint that is snug and free of wobble. In the preferred embodiment, I chose Easton Aluminum 7075W-T9 aluminum alloy insert tubes with a outside diameter of 0.303", wall thickness of 0.025" and a silver anodized finish.

Inside the segments is an elastic cord 24 that is anchored in two locations, inside the segment with the foot 20 attached by a cord lock 26, and inside the segment that contains the threaded female leg receptacle 30, attached by another cord lock 26. This elastic cord 24 is constantly under tension.

The threaded female leg receptacle 30 is affixed by force fit, adhesive or some other technique. The threaded male ball 32 is designed to screw into the threaded female leg receptacle 30. The threaded male ball 32 was designed to allow the installation of threaded ball socket keeper 34 prior to screwing threaded male ball 32 into the threaded female leg receptacle 30. In the preferred embodiment, I chose to use archery standard, aluminum threaded inserts. The ball unit 32 should be manufactured out of a strong, non-corrosive material such as stainless steel or aluminum. In the preferred embodiment, I chose aluminum with an silver anodized finish to achieve a desired level of surface hardness.

Referring to FIG. 4 (which shows one of the two threaded male balls 32 aligned with leg junction 38), the two ball socket washers 36 and the two threaded male balls 32 are inserted into leg junction 38 followed by the two threaded ball socket keepers 34. The two threaded ball socket keepers 34 are screwed into the leg junction 38 with the proper end of wrench 68 to the desired tension. The leg junction 38 can be manufactured out of any strong lightweight material such as plastic or aluminum. The ball socket washers 36 and threaded ball socket keepers 34 should be manufactured out a material that is softer than ball unit 32, so as not to cause abrasion on the threaded male balls 32. In the preferred embodiment I chose nylon for the two ball socket washers 36 and the two threaded ball socket keepers 34.

Figure 5:
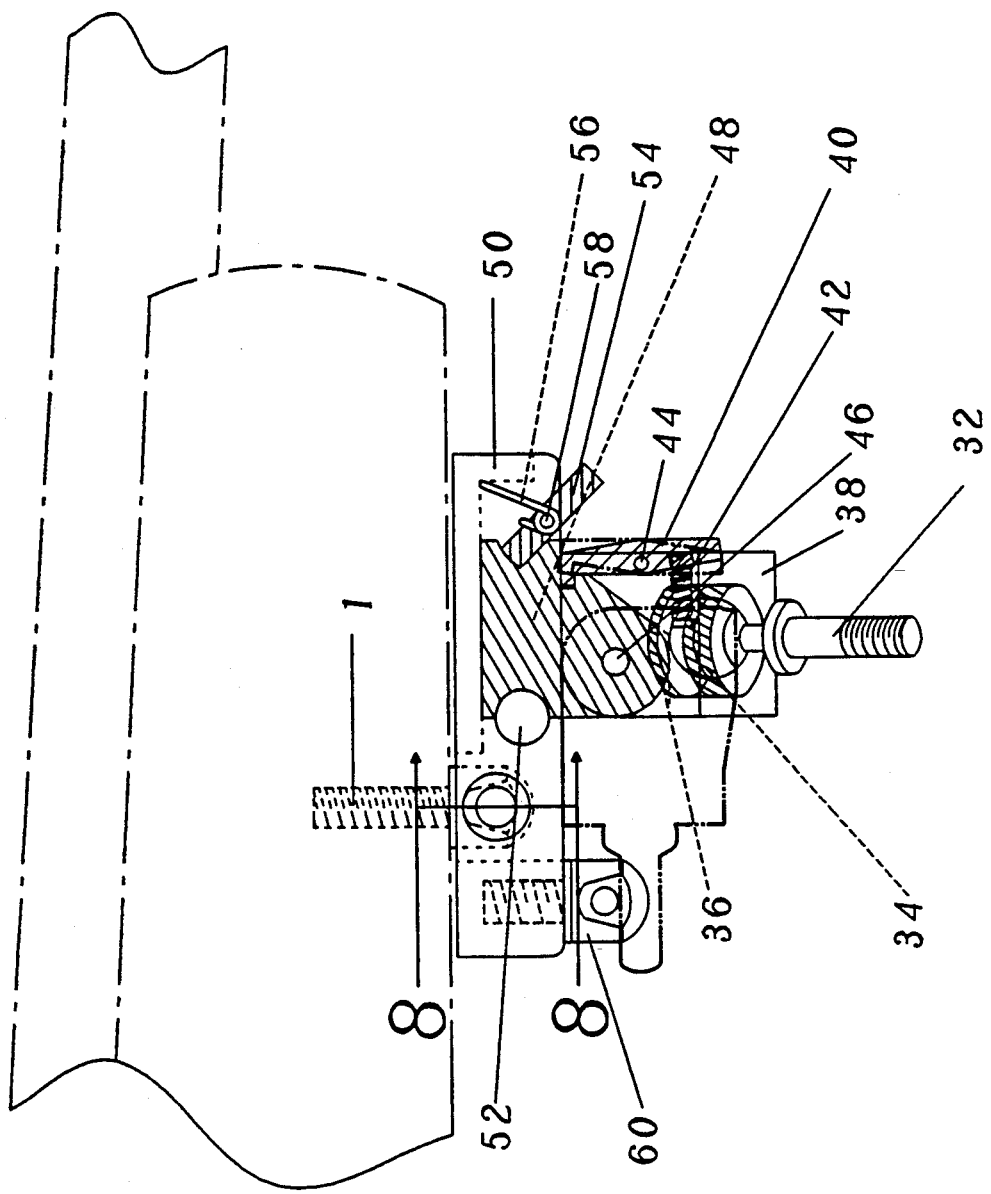
FIG. 5 is a side view of a bipod attachment unit (excluding legs). Range of motion is shown with phantom lines, according to my invention. The phantom lines show the bipod rotated to a carrying orientation wherein the legs of the bipod lie parallel to the longitudinal axis of the firearm.

Referring to FIG. 5, the leg rotation release spring 42 is inserted into its receptive cavity located in leg junction 38. In the preferred embodiment I chose stainless steel for the leg rotation release spring 42, for it non-corrosive characteristics. The leg rotation release spring 42 should be strong enough to provide positive engagement between leg rotation release 40 on main attachment block 48, yet light enough to allow depression of leg rotation release 40 with one finger.

After insertion of leg rotation release spring 42, leg rotation release 40 is positioned to allow insertion of leg rotation release axle 44 through leg junction 38 and leg rotation release 40. FIG. 5 shows the proper orientation of leg rotation release 40 to leg junction 38, so to align leg rotation release 40 with the mating slot in main attachment block 48. Leg rotation release 40 could be manufactured out of aluminum or plastic. In the preferred embodiment, I chose aluminum for its durability and strength. Leg rotation release axle 44 should be manufactured out of steel or stainless steel because of its durability. In the preferred embodiment, I chose stainless steel for its non-corrosive properties.

Figure 6:
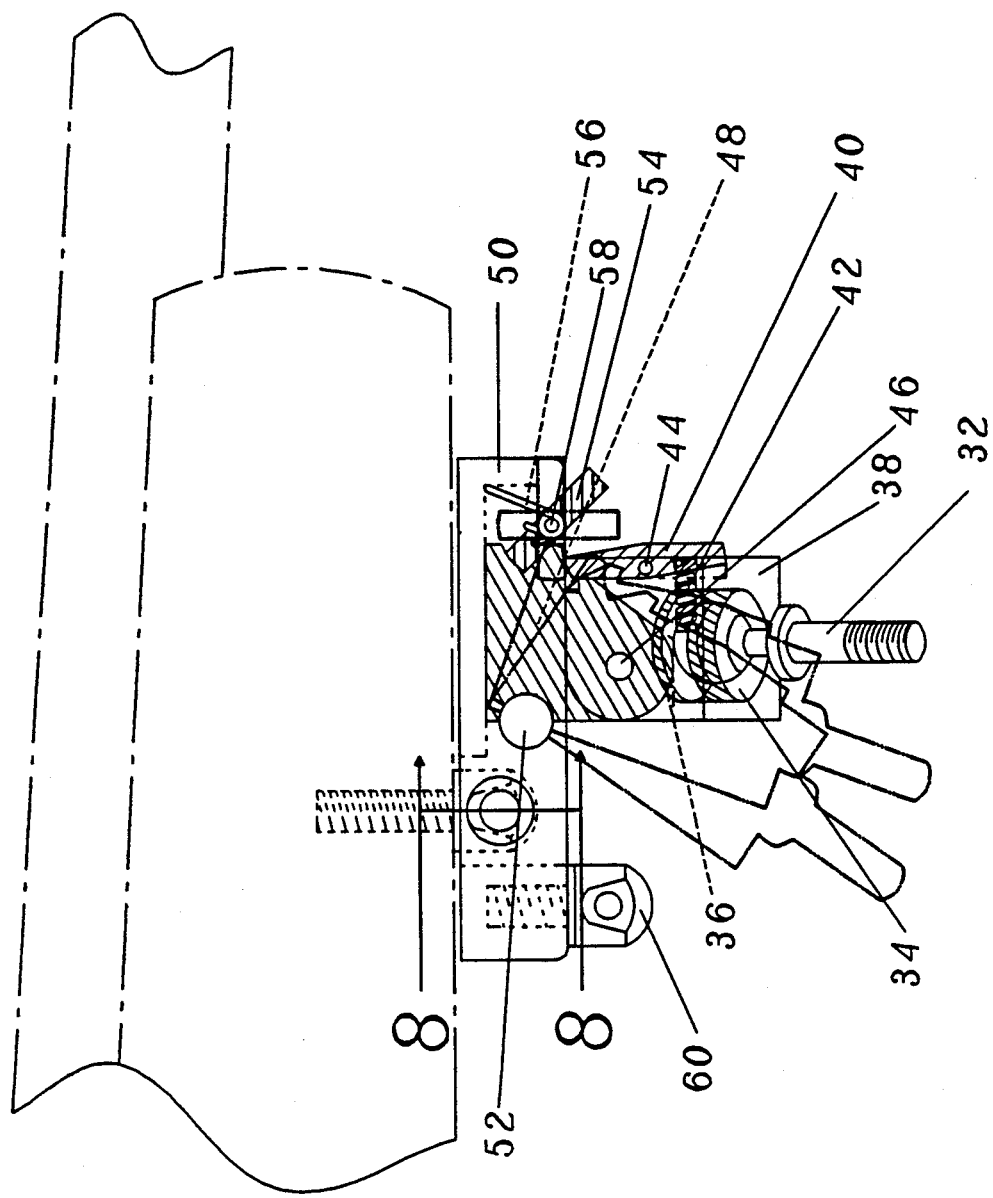
FIG. 6 is a side view illustration of a bipod attachment unit (excluding legs). Range of motion is shown with phantom lines, according to my invention. The phantom lines show the bipod in the process of being attached or detached to the firearm.
Figure 7:
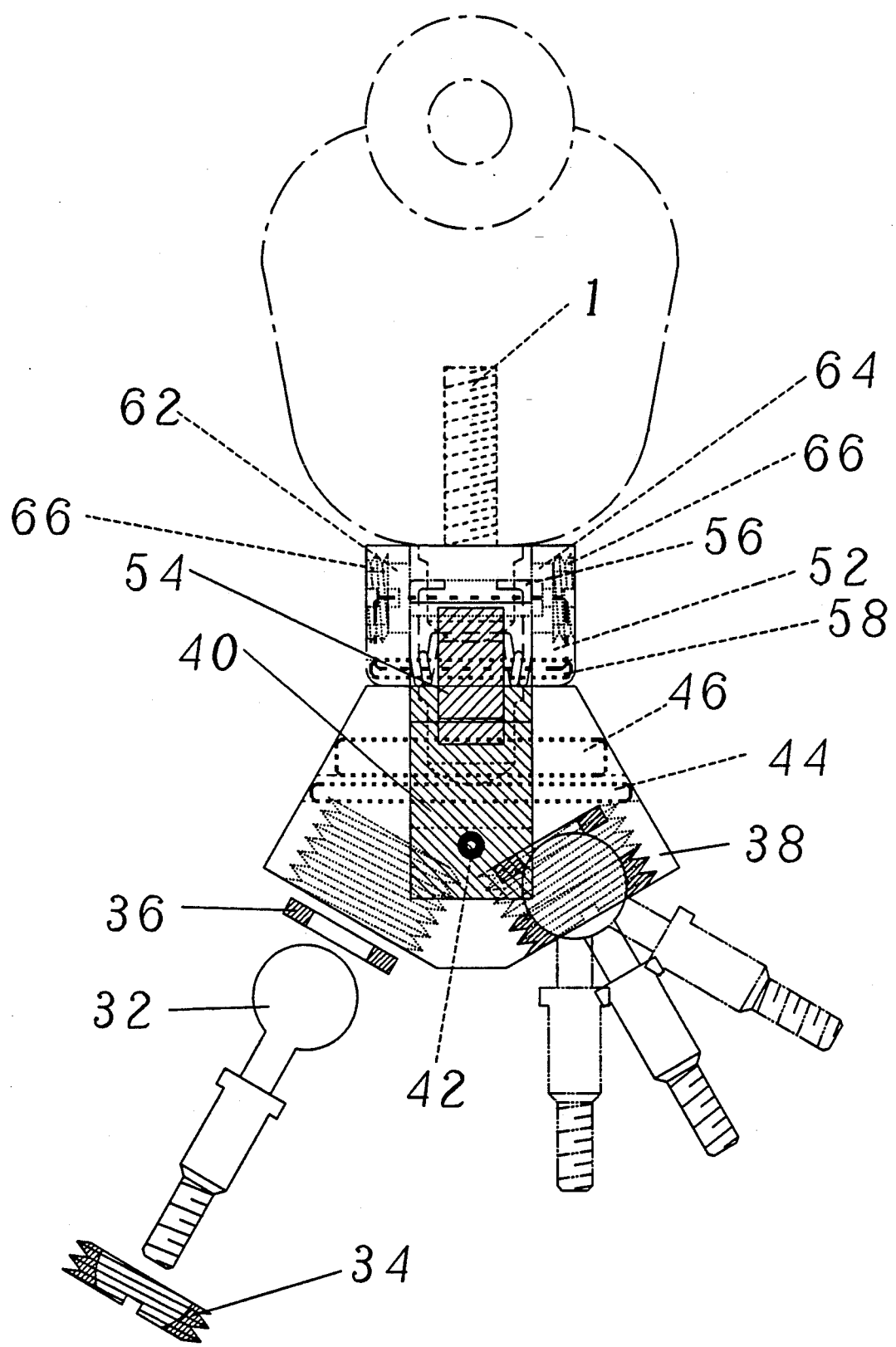
FIG. 7 is a front view illustration of a bipod attachment unit. Range of motion is shown with phantom lines, according to my invention. The phantom lines show the ball socket's motion capabilities.

Main attachment block 48 is inserted into leg junction 38 as shown in FIGS. 4, 5 and 6. FIGS. 5 and 6 show side views of the proper installed/aligned position. The hole in main attachment block 48 is aligned with the hole in leg junction 38 and leg rotation axle 46 is inserted. Main attachment block 48 can be manufactured out of any strong, lightweight, non-corrosive material. In the preferred embodiment, I chose aluminum, which is black anodized. Leg rotation axle 46 should be manufactured out of steel or stainless steel because of its durability. In the preferred embodiment, I chose stainless steel for its non-corrosive properties.

The surrogate sling block 50 should be manufactured out of a strong material such as stainless steel, steel or aluminum. When in use, surrogate sling block 50 receives the stress delivered by the operators gun sling, which is attached to surrogate sling swivel 60. These stresses are significant enough to eliminate plastic as a choice, so in the preferred embodiment I chose aluminum, which is black anodized.

Pressed into surrogate sling block 50 is main attachment axle 52. Main attachment axle 52 should be manufactured out of steel or stainless steel. In the preferred embodiment, I chose stainless steel for its non-corrosive properties.

The attachment retaining lever 54 and attachment retaining lever spring 56 are attached to surrogate sling block 50 via attachment retaining lever axle 58. Attachment retaining lever 54 should be manufactured out of steel, stainless steel, or aluminum. In the preferred embodiment, I chose aluminum, which is black anodized to match the finish applied to surrogate sling block 50. Attachment retaining lever axle 58 should be manufactured out of stainless steel for its non-corrosive properties. Attachment retaining lever spring 56 should be manufactured out of steel or stainless steel. Attachment retaining lever spring 56 should provide strong, positive engagement between attachment retaining lever 54 and main attachment block 48, yet light enough to allow lifting of attachment retaining lever 54 with one finger. As shown in FIG. 4, attachment retaining lever spring 56 has one and one half coiled revolutions on each side of attachment retaining lever 54. This will provide enough tension and coil/recoil to allow attachment retaining lever 54 ninety degrees of movement which is required for proper function. This movement is shown in FIG. 6.

Surrogate sling swivel 60 is threaded to match the female threads located in the surrogate sling block 50. The female threaded hole is located on the end of the surrogate sling block 50 opposite the end with the attachment retaining lever 54 attached. Due to the stresses delivered from the users sling, surrogate sling swivel 60 is manufactured out of either steel or stainless steel. In the preferred embodiment, I chose stainless steel for its non-corrosive properties. With the exception of the threaded section just mentioned, the other dimensions of the surrogate sling swivel 60 must match exactly with the standard sling swivels used in the firearm industry.

FIGS. 8a, 8b and 8c, show a sectional cross cut of the swivel stud attachment area of surrogate sling block 50 with parts, eccentric sling swivel attachment pin 62, eccentric pin receptor washer 64 and eccentric pin rotation locks 66 in their proper locations. The holes are designed such that eccentric sling swivel attachment pin 62 and eccentric pin receptor washer 64 can be inserted into a seated position. This seated position allows the pin of eccentric sling swivel attachment pin 62 to span across the opening in surrogate sling block 50 intended for the firearm's swivel studs across to the equivalent opening on the other side of the surrogate sling block 50, and finally into the female mating hole in eccentric pin receptor washer 64. This seated position prevents the head of eccentric sling swivel attachment pin 62, and eccentric pin receptor washer 64 from touching the swivel stud attached to the firearm or entering the hole. Each hole is threaded from the outside as shown in FIGS. 8a, 8b, and 8c to allow eccentric pin rotation locks 66 to be screwed into position. Eccentric sling swivel attachment pin 62 and eccentric pin receptor washer 64 should be manufactured out of either steel or stainless steel to provide the required level of durability and strength. In the preferred embodiment, I chose stainless steel, for is non-corrosive properties. Eccentric pin rotation locks 66 can be manufactured out of steel, stainless steel, brass or nylon. In the preferred embodiment, I chose nylon for its thread gripping self locking properties.

OPERATION OF INVENTION

Before the bipod can be used in actual shooting situations, the surrogate sling block 50 must be pre-attached to the firearm. For the purpose of illustration, assume that the following parts are pre-installed by the manufacturer, and will hence be called surrogate sling assembly:
52: Main attachment axle
54: Attachment retaining lever
56: Attachment retaining lever spring
58: Attachment retaining lever axle
60: Surrogate sling swivel.

The following steps outline the process for installing surrogate sling assembly to the firearm:
1. Place the firearm in a position with the barrel lying parallel with the horizon, and the stock up. The surrogate sling block 50 (FIG. 4) is aligned with the surrogate sling swivel 60 pointing up and towards the breach end of the firearm. The eccentric sling swivel attachment pin 62, eccentric pin receptor washer 64 and eccentric pin rotation locks 66 (FIGS. 4, 8a, 8b and 8c) are not assembled in surrogate sling block 50 at this time. Position the rectangular hole in surrogate sling block 50 directly over the firearm's sling swivel stud and lower the surrogate sling block 50 onto the firearm's sling swivel stud.
2. Take the eccentric sling swivel attachment pin 62 and insert it through one of the two holes in the side of surrogate sling block 50, and through the hole in the firearm's sling swivel stud. Be sure that the eccentric sling swivel attachment pin 62 is seated correctly as shown in FIGS. 8a, 8b and 8c.
3. Take eccentric pin receptor washer 64, and place it in the hole on the other side of the surrogate sling block 50, such that the screwdriver slot faces outward, and the eccentric hole aligns with the end of the pin in the eccentric sling swivel attachment pin 62. Be sure the eccentric pin receptor washer 64 is seated correctly as shown in FIGS. 8a, 8b and 8c.
4. Take the two eccentric pin rotation locks 66 and screw them into the two threaded holes in the sides of the surrogate sling block 50, where the eccentric sling swivel attachment pin 62 and eccentric pin receptor washer 64 were just inserted. Be sure that the screwdriver slots in the two eccentric pin rotation locks 66 are facing outward, but be careful to not over tighten them at this point in time.
5. Insert a small flathead screwdriver through the hole inside eccentric pin rotation lock 66 on the side of the surrogate sling block 50 where the eccentric sling swivel attachment pin 62 was inserted. Turn the screwdriver clockwise until the surrogate sling block 50 is drawn tight against the firearm stock. Hold the screwdriver while using the proper end of wrench 68 to turn the eccentric pin rotation lock 66 clockwise against eccentric sling swivel attachment pin 62, and "locking" it in position.
6. Insert the screwdriver through the hole inside eccentric pin rotation lock 66 on the side of the surrogate sling block 50 where the eccentric pin receptor washer 64 was inserted. Turn the screwdriver counter-clockwise until the surrogate sling block 50 is further drawn tight against the firearm stock. Hold the screwdriver while using wrench 68 to turn the eccentric pin rotation lock 66 clockwise against eccentric pin receptor washer 64, and "locking" it in position.

The firearm with surrogate sling assembly is now ready for field use.

The small size and weight of the surrogate sling block 50 has negligible impact on the appearance or balance of the firearm.

For the purpose of illustration, assume that the following parts are pre-installed by the manufacturer, and will hence be called lower bipod assembly:
20: Foot
22: Leg segment
24: Elastic cord
26: Cord lock
28: Tubular insert
30: Threaded female leg receptacle
32: Threaded male ball
34: Threaded ball socket keeper
36: Ball socket washer
38: Leg junction
40: Leg rotation release
42: Leg rotation release spring
44: Leg rotation release axle
46: Leg rotation axle
48: Main attachment block.

The lower bipod assembly is normally stored and carried in a fully-folded position on the person. To ready the bipod for use, the user need merely grip the leg junction 38 in one hand with the arm extending down. When this hand is moved quickly forward and up, the individual leg segments 22 will swing away from the leg junction 38 and forward in an upward arc. The individual segments will then come into alignment so as to be coaxial with each other. Then elastic cord 24 will snap or pull the five segments together into an extended ready position as shown in FIG. 1 and FIG. 2. The entire operation is almost instantaneous.

The short length of the folded lower bipod assembly allows it to be easily carried on the user in ways that are more convenient than the long, conventional one piece bipod legs. For example the folded bipod can be carried in the user's coat pocket, a large pant pocket or a sheath designed for said bipod and attached to the users belt.

Referring to FIG. 6, once the lower bipod assembly is fully extended, the user attaches it to the surrogate sling assembly (pre-installed to the users firearm) with the following steps;
1. Be certain that the leg rotation release 40 is properly engaged with main attachment block 48 so to prevent main attachment block 48 and leg junction 38 from rotating about leg rotation release axle 44.
2. Tilt the lower bipod assembly back towards the breach end of the firearm approximately twenty to thirty degrees. Align the half moon arch in main attachment block 48 with the main attachment axle 52.
3. Bring the main attachment block 48 into contact with the main attachment axle 52, along the circumference of the half moon arch of the main attachment block 48.
4. Slowly rotate the lower bipod assembly forward until the attachment retaining lever 54 is contacted by the main attachment block 48.
5. Continue slowly rotating the lower bipod assembly until the attachment retaining lever 54 is pushed out of the way and it has completed a full ninety degrees of rotation.
6. Continue rotating the bipod assembly until it is firmly seated inside the surrogate sling block 50, at which time the attachment retaining lever 54 will snap into a locked position at a forty five degree angle.

The lower bipod is now attached to the surrogote sling assembly and the firearm and is ready for use.

The use of ball joints in my invention allows for considerable flexibility in positioning and use of the bipod.

It is easy to use the bipod as a monopod by simply positioning the legs as close to each other as possible, shown in FIG. 2. This incarnation could be useful in a situation where the user is in extreme steep terrain, and can not find suitable ground to place the spread legs and feet of the bipod on.

To use the bipod from the sitting position, the user spreads the legs out to achieve a comfortable height. The wider the stance of the legs the lower the firearm will be, the narrower the stance the higher the firearm will be.

It is not necessary that each leg maintain the same angle to the firearm, or to the axis that runs from the center of the earth to the bipod/firearm mounting point. Also it is not necessary that each leg of the bipod remain equal in distance from the user.

In a field situation where the user is in steep terrain and desires to shoot at a target that is on the same side slope as the user, it would be difficult to find a resting location where the feet of the bipod could be placed on the same level. In this situation, the user places the leg adjacent to the downhill slope closer to the vertical position, and the leg adjacent to the uphill slope closer to the horizontal position. As long as the weight of the firearm remains between the two legs of the bipod, the desired stabilizing effect will be realized.

The bipod is particularly effective in a field situation where the user is in steep terrain and desires to shoot at a target across a valley and at the same level as the user. Because of the length of the legs, it is easy for the user to position the legs down slope, but still shoot comfortably from the sitting position. In this field situation is almost impossible to shoot comfortably from the prone position. As an additional stabilizing aid, the user's back can be rested against the side hill, a backpack, tree or rock.

To accommodate shooting from the prone position, the leg segments can be partially assembled to the desired length. Using just the segment that is attached to the threaded male ball 32 and not joining the other segments, the user is provided with the lowest possible shooting position. When using the bipod in this fashion the unused segments are simply allowed to lie loosely on the earth. To provide additional height, other segments can be joined one at time starting with the segments closest to the segment with the threaded male ball 32.

The use of ball joints to attach the legs to the bipod gives the bipod the inherent ability to perform the horizontal panning motion, vertical panning motion and firearm cant motion. Without moving the legs fore/aft, up/down, in/out or left/right, the firearm's muzzle and butt can be moved about in a circular motion as if forming the opening of a cone. The ball joints effortlessly and smoothly perform this movement while the user can continue to aim the firearm or choose different targets.

In certain situations where the user has connected the lower bipod assembly to the surrogate sling assembly (and the firearm), it may be desirable to quickly relocate to another area without removing the lower bipod assembly. Such a situation could happen when the intended target moves and the original shooting location does not provide a clear shooting vantage point. Referring to FIG. 5, the lower bipod assembly is designed with a leg rotation release 40. By depressing the leg rotation release 40 the legs quickly and quietly fold back along the firearm. The user can then grip the firearm and legs together as one entity and relocate positions without the legs obtrusively protruding from the firearm and interfering with foliage or other obstacles.

With any bipod, the human body actually provides the third leg of a tripod. Any improvement the user can make to further steady the human body will improve the overall stability. Resting against a tree, rock or a back pack will improve the overall stability while using my invention.

Referring to FIG. 6, to remove the lower bipod assembly from the surrogate sling assembly (and the firearm) use the following steps:
1. Be certain that the leg rotation release 40 is properly engaged with the main attachment block 48 so to prevent main attachment block 48 and leg junction 38 from rotating about leg rotation release axle 44.
2. Using one hand to maintain control of the firearm, grip the main attachment block 48 with the other hand such that the fingers are towards the firearm's muzzle.
3. While maintaining the grip on the main attachment block 48, reach forward with the index finger and gently pull the attachment retaining lever 54 towards the rear of the firearm.

4. Once the attachment retaining lever 54 is perpendicular to the longitudinal axis of the firearm, the main attachment block 48 (and entire lower bipod assembly) can be rotated towards the breach end of the firearm and lifted out of the surrogate sling block 50.
5. Once removed from the surrogate sling block 50, gently pull the legs segments apart and fold for storage.

Another feature of the preferred embodiment is the ability to adjust the tension of the individual ball joints to preference. The threaded ball socket keepers 34 are designed with adjustment slots that one end of the wrench 68 matches. Turning the threaded ball socket keepers 34 clockwise will tighten the fit of the ball joint, and conversely, turning the threaded ball socket keepers 34 counter clockwise will loosen the fit of the ball joint.

SUMMARY

As the reader can see, the firearm rest of this invention provides freedom of motion not previously available, while remaining securely attached to the firearm. Furthermore, the firearm rest has the additional advantages in that;

it quickly attaches and detaches in the field;
it folds into a compact, lightweight and convenient package suitable for small pockets or carrying locations;
it quickly and easily adapts to uneven and physically diverse ground surfaces;
it quickly and easily adapts to sitting or prone shooting positions;
it is rigid and strong;
it provides the ability to fold the legs back parallel to the firearm without removing the lower bipod assembly to allow for "last second" changes in shooting position or location;
it only requires the surrogate sling assembly to remain attached to the firearm when from the detracting from the appearance and balance of the firearm.

Although the description above contains many detail specificity's, these should not be construed as limiting the scope of my invention, but merely providing illustrations of the presently preferred embodiment of this invention. For example;

the ball joints could be replaced with universal joints, constant velocity joints, etc.;
the surrogate sling assembly could be replaced with a mechanism that connects in-line between the firearms sling and sling swivel stud, moves with the sling, yet provides an attachment for the ball joint unit;
or the surrogate sling assembly could be replaced with another mechanism that utilizes the common sling adapters found on popular firearms with tubular magazines, or barrel bands.

Thus the scope of my invention should be determined by the appended claims and their legal equivalents, rather than by the examples given.

I claim:

1. A firearm rest comprising:
   (a) two legs connected to a common leg junction means;
   (b) said leg junction means coupled to a firearm mounting means, and;
   (c) said firearm mounting means statically attachable to a firearm;
   (d) leg attachment means interconnecting each of said legs to said common leg junction means whereby each leg may be moved relative to said leg junction means independently of the other leg;
   said leg junction means and said leg attachment means being so constructed and arranged such that the interconnection therebetween enables said leg junction means to be horizontally panned, vertically panned, and canted as a result of relative movement of said leg junction means with respect to said two legs that is afforded by said leg attachment means whereby said firearm rest, when attached to a firearm and having said legs placed on a supporting surface, said firearm has the ability to concurrently rotate about an axis extending from the center of the earth to said firearm mounting means, rotate about an axis that is parallel to the longitudinal axis of the firearm and rotate about an axis that is perpendicular to both the longitudinal axis of the firearm as well as the axis extending from the center of the earth to said firearm mounting means, as a result of relative movement of said leg junction means with respect to said two legs.

2. The firearm rest of claim 1 further including a leg coupling means coupling said leg junction means to said firearm mounting means, said leg coupling means being so constructed and arranged that it releasibly fixes the position of said leg junction means relative to said firearm mounting means whereby, when said leg coupling means releases said leg junction means, said leg junction means may be rotated to allow said legs to rotate to a position substantially parallel to the longitudinal axis of said firearm.

3. The firearm rest of claim 1 further including a leg release means to allow said legs and said junction means to be quickly attached or detached from said firearm mounting means.

4. The firearm rest of claim 1 wherein said firearm mounting means has a hole in said firearm mounting means for receiving the extending head of a bolt on the forearm of said firearm, said head of bolt having a transverse aperture, eccentric axis pin means, transverse hole in said firearm mounting means coaxial with transverse aperture in said head of bolt, said eccentric axis pin means insertable in said transverse hole in firearm mounting means and through transverse aperture in said head of bolt, eccentric pin receptor washer means, eccentric lock means whereby said eccentric pin means can be rotated so as to tighten said firearm mounting means to forearm of said firearm and locked in position, said firearm mounting means providing surrogate extend bolt having a transverse aperture.

5. The firearm rest of claim 1 wherein said legs constructed of a tubular shaft comprised of multiple sections;
   (a) mating means enabling said sections to be assembled to form a continuous, substantially rigid shaft and to be disassembled so that said sections can be positioned side by side in an approximately parallel relationship;
   (b) an elastic cord internal to and connecting said sections, said cord having each of its ends connected to the two sections at extreme opposite poles, and being under sufficient tension so as to pull together said sections into a continuous shaft or leg, and;
   (c) retaining means for connecting each end of said cord to its respective sections.

6. The legs of claim 5 wherein said legs have attached a foot;

(a) said foot having an aperture means to receive the end of said leg that is opposite the end of said junction means, and provides a tight grip to said leg so as to remain affixed, and;

(b) said foot having a grip means on bottom of said foot that is firm yet pliable and contains multiple knobs so as to provide sufficient grip to a supporting surface.

7. A firearm rest comprising:

(a) two legs connected to a common leg junction means;

(b) said leg junction means having leg attachment means whereby said legs are allowed to move in a conical motion and/or randomly within confines of the cone defined by said conical motion, independent of each other;

(c) said leg junction means coupled to a firearm mounting means; and (d) said firearm mounting means statically attachable to a firearm;

whereby said firearm rest, when attached to a firearm and having said legs placed on a supporting surface, said firearm's muzzle can rotate in a conical motion with said leg junction means maintaining a position at the point of the cone and said legs remaining in a static position while allowing concurrent cant adjustments of said firearm and random movement of said firearm's muzzle within the confines of said cone.

8. The firearm rest of claim 7 further including a leg rotation means to allow said legs to rotate to a position substantially parallel to the longitudinal axis of said firearm.

9. The firearm rest of claim 7 further including a leg release means to allow said legs and said junction means to be quickly attached or detached from said firearm mounting means.

10. The firearm rest of claim 7 wherein said firearm mounting means has a hole in said firearm mounting means for receiving the extending head of a bolt on the forearm of said firearm, said head of bolt having a transverse aperture, eccentric axis pin means, transverse hole in said firearm mounting means coaxial with transverse aperture in said head of bolt, said eccentric axis pin means insertable in said transverse hole in firearm mounting means and through transverse aperture in said head of bolt, eccentric pin receptor washer means, eccentric lock means whereby said eccentric pin means can be rotated so as to tighten said firearm mounting means to forearm of said firearm and locked in position, said firearm mounting means providing surrogate extend bolt having a transverse aperture.

11. The firearm rest of claim 7 wherein said legs constructed of a tubular shaft comprised of multiple sections;

(a) mating means enabling said sections to be assembled to form a continuous, substantially rigid shaft and to be disassembled so that said sections can be positioned side by side in an approximately parallel relationship;

(b) an elastic cord internal to and connecting said sections, said cord having each of its ends connected to the two sections at extreme opposite poles, and being under sufficient tension so as to pull together said sections into a continuous shaft or leg, and;

(c) retaining means for connecting each end of said cord to its respective sections.

12. The legs of claim 11 wherein said legs have attached a foot;

(a) said foot having an aperature means to receive the end of said leg that is opposite the end of said junction means, and provides a tight grip to said leg so as to remain affixed, and;

(b) said foot having a grip means on bottom of said foot that is firm yet pliable and contains multiple knobs so as to provide sufficient grip to a supporting surface.

13. A firearm rest comprising:

(a) two legs connected to a common leg junction means;

(b) said leg junction means coupled to a firearm mounting means, and;

(c) said firearm mounting means statically attachable to a firearm;

said leg junction means being so constructed and arranged with respect to said two legs and with respect to said firearm mounting means that a firearm attached to said firearm mounting means may be horizontally panned, vertically panned, and canted as a result of movement occurring within said leg junction means relative to said two legs whereby said firearm rest, when attached to a firearm and having said legs placed on a supporting surface, said firearm has the ability to concurrently rotate about an axis extending from the center of the earth to said firearm mounting means, rotate about an axis that is parallel to the longitudinal axis of the firearm and rotate about an axis that is perpendicular to both the longitudinal axis of the firearm as well as the axis extending from the center of the earth to said firearm mounting means, as a result of relative movement of said leg junction means with respect to said two legs.

14. The firearm rest of claim 13 further including a leg coupling means coupling said leg junction means to said firearm mounting means, said leg coupling means being so constructed and arranged that it releasibly fixes the position of said leg junction means relative to said firearm mounting means whereby, when said leg coupling means releases said leg junction means, said leg junction means may be rotated to allow said legs to rotate to a position substantially parallel to the longitudinal axis of said firearm.

15. The firearm rest of claim 13 further including a leg release means to allow said legs and said junction means to be quickly attached or detached from said firearm mounting means.

16. The firearm rest of claim 13 wherein said legs are constructed of a tubular shaft comprised of multiple sections;

(a) mating means enabling said sections to be assembled to form a continuous, substantial rigid shaft and to be disassembled so that said sections can be positioned side by side in an approximately parallel relationship;

(b) an elestic cord internal to and connecting said sections, said cord having each of its ends connected to the two sections at extreme opposite poles, and being under sufficient tension so as to pull together said sections into a continuous shaft or leg, and;

(c) retaining means for connecting each end of said cord to its respective sections.

17. The legs of claim 16 wherein said legs have attached a foot;

(a) said foot having an aperture means to receive the end of said leg that is opposite the end of said junction means, and provides a tight grip to said leg so as to remain affixed, and;

(b) said foot having a grip means on bottom of said foot that is firm yet pliable and contains multiple knobs so as to provide sufficient grip to a supporting surface.

* * * * *